Figure 1:
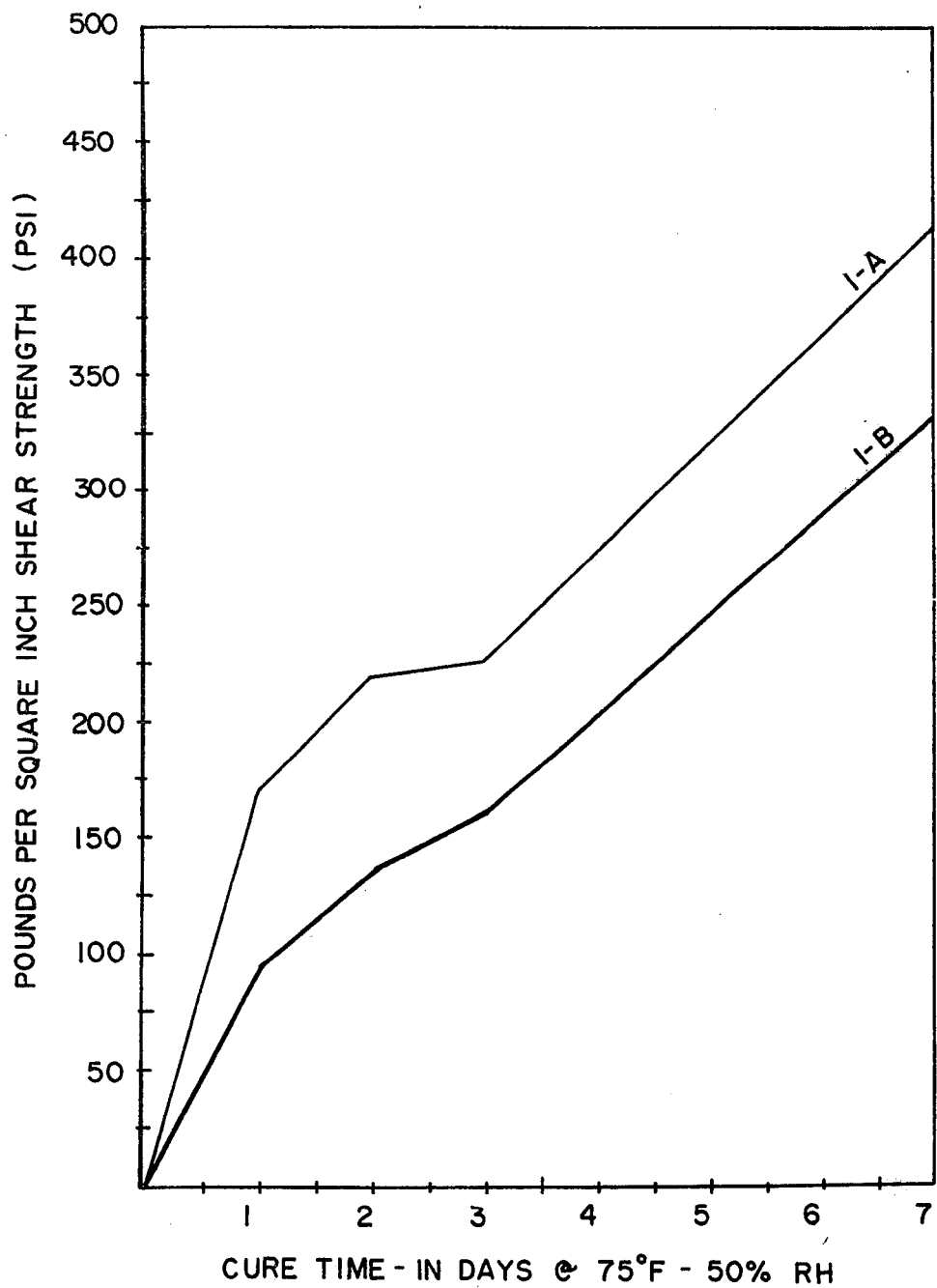
Figure 2:
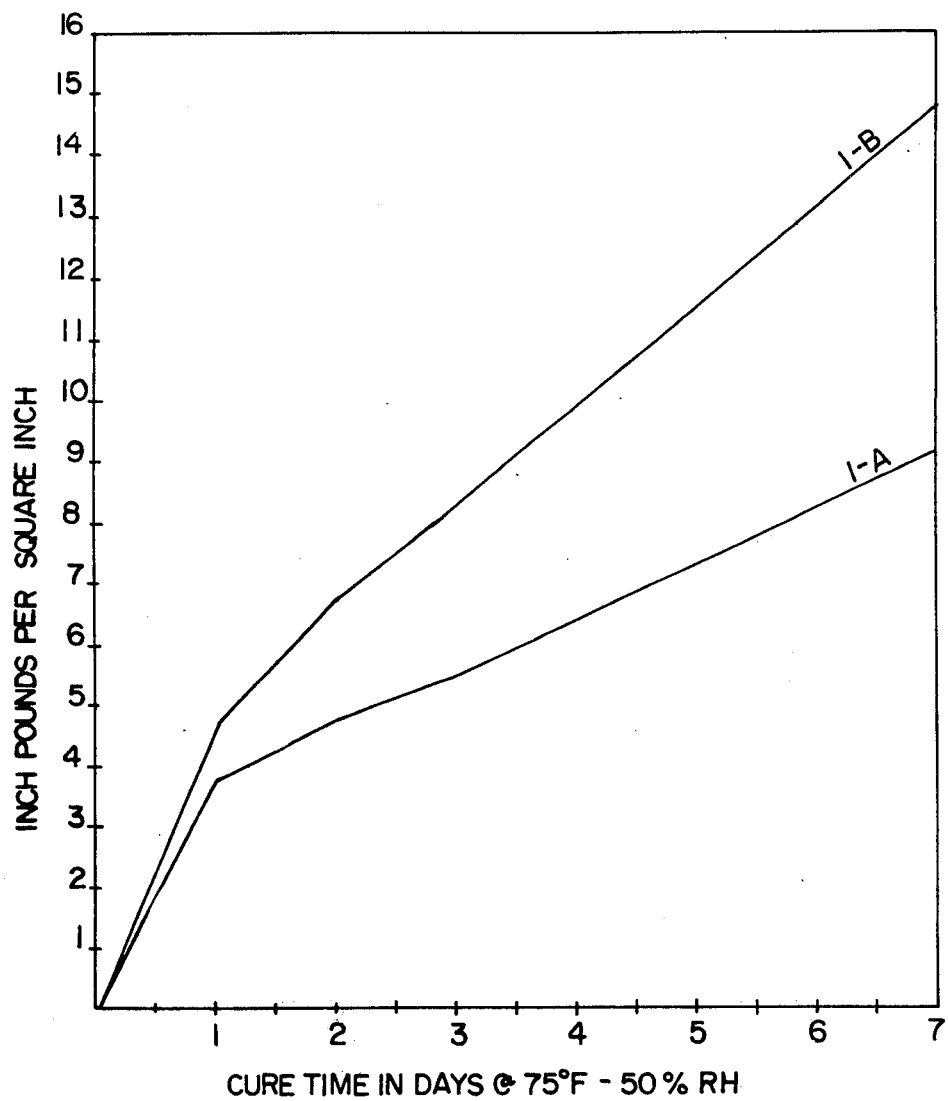

United States Patent [19]

Georgeau et al.

[11] 4,005,033
[45] Jan. 25, 1977

[54] RESILIENT ORGANIC MICROSPHERES IN MASTIC ADHESIVES, SEALANTS, CAULKS, COATING COMPOUNDS AND RELATED PRODUCTS, AND METHODS OF MANUFACTURE

[75] Inventors: Phillip Carl Georgeau; Lester I. Winebrenner, both of Kalamazoo, Mich.

[73] Assignee: Champion International Corporation, Stamford, Conn.

[22] Filed: May 17, 1973

[21] Appl. No.: 361,364

[52] U.S. Cl. .................. 260/2.5 B; 260/2.5 L; 260/29.6 PS; 260/29.6 RB; 260/29.6 WA; 260/33.4 R; 260/33.2 R; 260/42.17; 260/42.49; 260/42.51; 260/42.55; 260/899
[51] Int. Cl.² .................. C08J 9/32; C08J 9/22
[58] Field of Search .................. 260/2.5 B, 2.5 L

[56] References Cited

UNITED STATES PATENTS

| | | | |
|---|---|---|---|
| 2,797,201 | 6/1957 | Veatch et al. | 260/2.5 B |
| 3,316,187 | 4/1967 | Grosner | 260/2.5 B |
| 3,615,972 | 10/1971 | Morehouse, Jr. | 260/2.5 B |

*Primary Examiner*—Wilbert J. Briggs, Sr.
*Attorney, Agent, or Firm*—Evelyn M. Sommer; Anthony J. Casella

[57] ABSTRACT

Improved mastic adhesives, sealants, caulks, coating compounds and related products by using in combination therewith hollow resilient organic microspheres and the method of manufacture.

5 Claims, 8 Drawing Figures

ELASTIC LIMIT

RESILIENT ORGANIC MICROSPHERES IN MASTIC ADHESIVES, SEALANTS, CAULKS, COATING COMPOUNDS AND RELATED PRODUCTS, AND METHODS OF MANUFACTURE

The present invention is generally concerned with improved high quality mastic adhesives, sealants, caulks and coated compounds. These formulations vary widely in composition but in general a mastic adhesive or sealant comprises an acrylic latex or a vinyl acrylic latex in combination with other materials such as polyvinyl acetate, solids such as barium sulfate and calcium carbonate and water.

With respect to these products, it is known to add an inert material or a mixture or inert solids, for example, in order to extend the product, to lower the cost, to add solid content, to increase the viscosity, to improve the application from a caulking gun and minimize slumping or sagging when applied to a vertical surface. However, the extending materials heretofore known and used in the art did not function to improve the adhesive or sealant or to impart desirable characteristics to the basic products, such as toughness, flexibility, resiliency, insulation characteristics, and acoustical properties. Furthermore, these known additives resulted in a heavier product thus greatly increasing transportation costs, and also greatly increasing the difficulty of application. The present invention permits the handling of a greater volume having less weight than a smaller volume thereby substantially reducing application costs. With the present invention, hand-caulking guns having a one gallon capacity may be readily and efficiently handled.

The present invention is concerned generally with adhesive and sealant mastics in conjunction with hollow resilient organic microspheres. The present invention is particularly desirable in conjunction with water based adhesives and sealants. The invention is more particularly concerned with the novel procedure of introducing the spheres into the adhesive and the unique method of expanding the spheres in a latex solution, an ingredient of the product, rather than quenching in water. A particular feature of the present invention is the use of a composition or mixture of the microspheres in predetermined ratios to obtain the maximum physical property and performance improvement.

A particular feature of the present invention is the use of a composition or mixture of the microspheres in predetermined ratios to obtain the maximum physical property and performance improvement.

The term "mastic" as used herein is any of several forms of heavy bodied adhesive materials with a minimum Brookfield viscosity of 50M cps. extruded from pumps, cartridges, or applied by knife or trowel to bonding surfaces. The 50M centipoise limit is rather arbitrary and exceptions can be made for highly thixotropic materials that have a lower Brookfield viscosity but have an essentially "non-slump" type of rheology. Mastics differ from liquid adhesives in their ability to stay in place after being applied, especially in vertical or overhead applications such as those most commonly found in building construction situations.

The principal advantage of a mastic over a liquid form of adhesive is that it minimizes waste due to spills and dripping and can usually be applied without brushes and rollers, etc., that require thorough cleanup after use.

The organic hollow microspheres are generally selected from a class of thermoplastic materials. Preferred spheres are heat expandable thermoplastic spheres. The preferred unblown spheres have a diameter of about 6–8 microns. Preferred are spheres composed of a polymer shell which enclose a liquid blowing agent. They may be produced spheres with a number of different polymer shell compositions, but the preferred product consists of a shell comprised of a Saran* polymer (vinylidene chloride/

*Trademark of The Dow Chemical Company. acrylonitrile) and isobutane as the blowing agent.

Upon heating to about 90° C, the blowing agent converts to a gas, causing the spheres to expand from the 6–8 micron diameter up to about 35 microns sphere diameter in the expanded form. The packed bulk density change accompanying this expansion is approximately as follows:

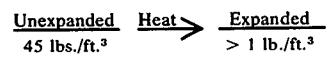

Unexpanded  Heat→  Expanded
45 lbs./ft.³           > 1 lb./ft.³

The true density for the unfoamed and foamed forms is as follows:

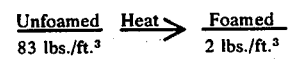

Unfoamed  Heat→  Foamed
83 lbs./ft.³         2 lbs./ft.³

Typical compositions by way of illustration are set forth in the following tables. The nomenclature for the formulations listed in the tables is as follows:

| | |
|---|---|
| Asbestos | Fiberous inorganic reinforcement and filler Canadian 7R5 or equivalent Canadian Std. Classification 0-0-0-16 |
| ASE 60 | Thickening resin based on polyacrylic acid Acrysol ASE 60 Rohm & Haas Co. |
| Atomite | $CaCO_3$ inorganic filler, 325 mesh Thomson & Weinman Co. |
| $BaSO_4$ | Barytes - inorganic filler, grey unrefined, 300 mesh Baker and Collinson Co., Detroit, Michigan |
| Butyl Cellosolve | Organic solvent - ethylene glycol monobutylether $C_4H_9OC_2H_4OH$, Molecular weight 118.18 Flash point 157° F T.O.C. |
| $CaCO_3$ | Inorganic filler, 300 mesh Q1 Quincy Co., Quincy, Illinois |
| Calgon T | Water conditioner and softener Calgon Div., Merck |
| Ethanol 95% | Organic solvent, denatured 95% |
| $H_2O$ | Water |
| Isopar K | Organic solvent, low odor mineral spirits Flash point 120° F T.O.C. K.B. value 27 Humble Oil & Refining Co. |

-continued

| | |
|---|---|
| 28% NH₄OH | 28% Amonia for pH adjustment to alkaline |
| PMA 30 | Organometalic biocide phenyl mercuric acetate Ventron Corp. |
| PMO 30 | Organometalic biocide phenyl mercuric oleate Ventron Corp. |
| PVA | Organic latex, polyvinyl acetate 40–55% solids Reichhold Co., Monsanto Co., National Starch |
| R 901 | Inorganic Titanium Dioxide white pigment Titanox - DuPont Corp. |
| Saran Microspheres | Organic low density filler based on an expanded polyvinylidine - acrylonitrile hollow shell approximately 30 microns in diameter Dow Chemical Co., Midland, Michigan |
| Tamol 850 | Wetting agent Rohm & Haas, Philadelphia, PA |
| TCP | Tri Cresyl phosphate - plasticizer Union Carbide Corp. |
| Triton x 405 | Surfactant Rohm & Haas - Philadelphia, PA |
| Ucar 153 | Acrylic latex binder 55% solids Union Carbide Corp. |
| Ucar 874 | Acrylic latex binder 60% solids Union Carbide Corp. |
| Urea | Farm grade prilled for |

Table I lists mastic compositions of 1B, while Table II lists compositions of 1A, which latter composition is identical to composition 1B except as indicated.

TABLE I

| | Mastic Composition 1B | | |
|---|---|---|---|
| | % By Wt. | % By Volume | % Range By Wt. |
| Ucar 874 | 51.73 | 49.432 | 20 – 66 |
| PVA | 8.01 | 7.651 | 1 – 30 |
| Calgon T | .40 | .352 | .1 – 2 |
| PMA 30 | .02 | .016 | .01 – 2 |
| BaSO₄ | 2.67 | .608 | .5 – 20 |
| CaCO₃ | 7.52 | 2.865 | .5 – 30 |
| Urea | .91 | .705 | .1 – 5 |
| Asbestos | 3.23 | 1.333 | 1 – 10 |
| Saran Microspheres | .32 | 10.296 | .05 – 10.0 Preferred 1 – 3 |
| ASE 60 | 1.18 | 1.156 | .1 – 5 Preferred .0 |
| Tritan x 405 | .70 | .673 | .1 – 2 |
| Tamol 850 | .22 | .193 | .1 – 2 |
| Ethanol 95% | 6.40 | 7.359 | .5 – 10 |
| Butyl Cellosolve | 2.0 | 2.219 | .5 – 10 |
| H₂O | 13.92 | 14.370 | 1 – 25 |
| 28% NH₄OH | .67 | .771 | .1 – 2 |

TABLE II

| | Mastic Composition 1A | | |
|---|---|---|---|
| | % By Wt. | % By Volume | % Range By Wt. |
| BaSO₄ | 10.180² | 3.608 | .5 – 20 |
| CaCO₃ | 17.158² | 10.162 | .5 – 30 |
| Saran Microspheres¹ | 0 | — | — |

¹Replaced with an equivalent weight of BaSO₄ and CaCO₃ in the proportions seen in formula 1B.
²Increased in proportion to the amount of Saran Microspheres seen in formula 1B.

Table III lists a sealant composition 11B, while Table IV lists a sealant composition 11A which is identical to composition 11B except as indicated.

TABLE III

| | Sealant 11B | | |
|---|---|---|---|
| | % By Wt. | % By Volume | % Range By Wt. |
| Ucar 153 | 47.414 | 66.227 | 30 – 60 |
| Calgon T | .24 | .306 | .1 – 2 |
| TCP | 5.87 | 7.674 | .1 – 10 |
| PMO 30 | .08 | .124 | .01 – 2 |
| Isopar K | .155 | .305 | .1 – 5 |
| R 901 | .48 | .172 | .2 – 10 |
| Atomite | 15.196 | 8.397 | 1 – 30 |
| Saran Microspheres | .33934¹ | 16.967 | .001 – 10.0 |

TABLE III-continued

| | Sealant 11B | | |
|---|---|---|---|
| | % By Wt. | % By Volume | % Range By Wt. |
| | | | Preferred .01 – 5.0 |

¹Equivalent to 30.394% by wt. and 16.967% by volume Atomite.

TABLE IV

| | Sealant 11A | | |
|---|---|---|---|
| | % By Wt. | % By Volume | % Range By Wt. |
| Microspheres | 0.0 | — | — |
| Atomite | 45.59 | 25.192 | 1 – 30 |

A third pair of formulas, Tables V and VI, are 11A and 11B sealant formulas with the TCP plasticizer removed. The reason for including this set is to demonstrate the improved mechanical properties of the Saran modified sealant without the masking effect of the plasticizer. This demonstrates a reduction in plasticizer requirements in caulks and sealants formulated with Saran microspheres.

TABLE V

| | Composition 111A | | |
|---|---|---|---|
| | % By Wt. | % By Volume | % Range By Wt. |
| Ucar 153 | 47.414 | 66.227 | 30 – 60 |
| Calgon T | .24 | .306 | .1 – 2 |
| TCP² | — | — | — |
| PMO 30 | .08 | .124 | .01 – 2 |
| Isopar K | .155 | .305 | .1 – 5 |
| R 901 | 0.48 | .172 | .2 – 10 |
| Atomite | 45.59 | 25.192 | 20 – 60 |

TABLE VI

| | Composition 111B | | |
|---|---|---|---|
| | % By Wt. | % By Volume | % Range By Wt. |
| Ucar 153 | 47.414 | 66.227 | 30 – 60 |
| Calgon T | .24 | .306 | .1 – 2 |
| TCP² | — | — | — |
| PMO 30 | .08 | .124 | .01 – 2 |
| Isopar K | .155 | .305 | .1 – 5 |
| R 901 | .48 | .172 | .2 – 10 |
| Atomite | 15.196 | 8.397 | 1 – 40 |

TABLE VI-continued

| | Composition 111B | | | |
|---|---|---|---|---|
| Saran Microspheres | .33934 | 16.967 | .01 | – 5 |

*TCP deleted from formula equivalent to:
5.87% by wt.
7.674% by volume

Figure 8:
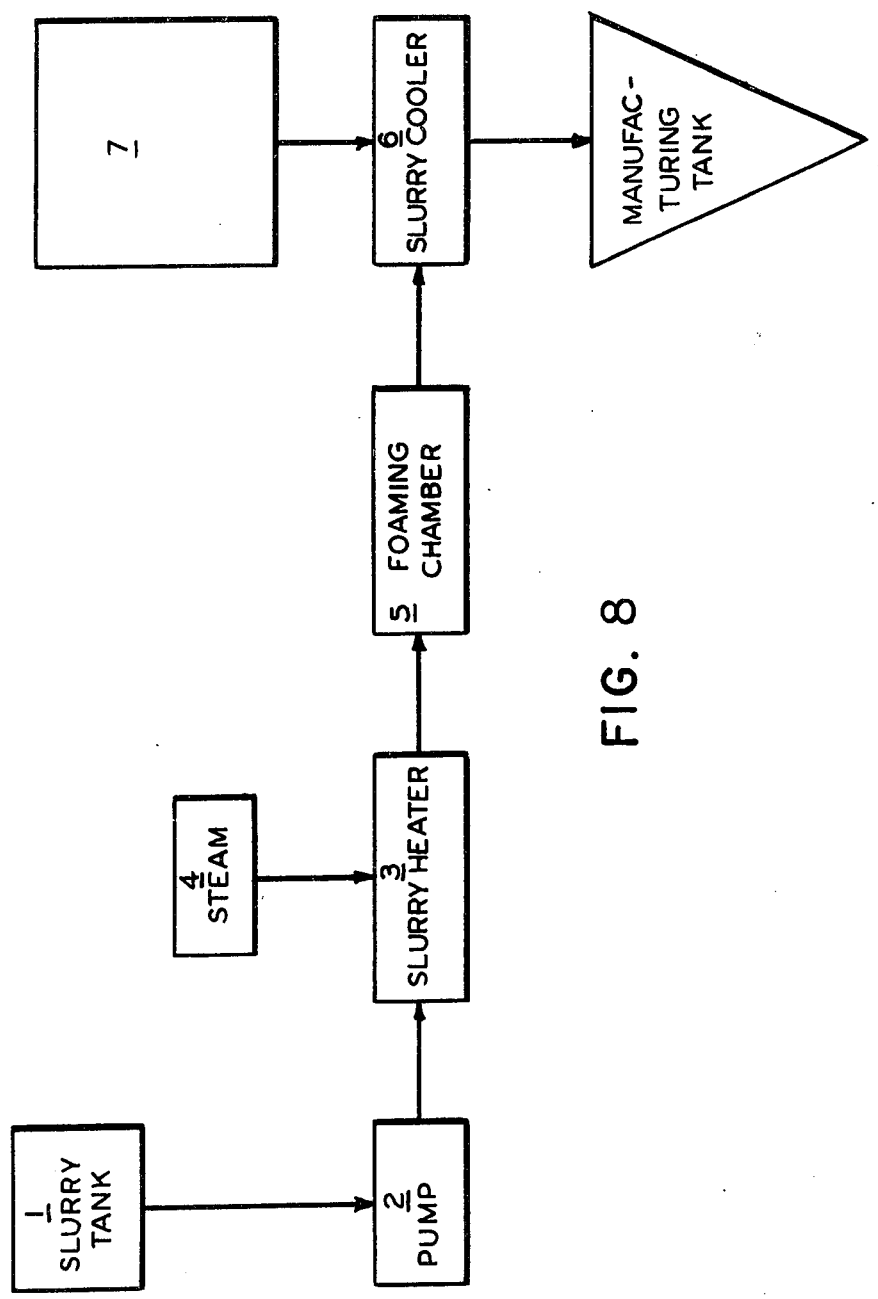

FIGS. 1 through 7 represent graphs illustrative of applicants' improved composition. FIG. 8 represents a flow chart of the process of this invention.

It is to be noted (graph FIGS. 1 and 2) that the shear strength values expressed in PSI favors the 1A formula. However, the shear values expressed in "inch pounds/sq. in." to destruction favor 1B. Inch pounds per sq. in. to destruction is a measure of toughness. In an adhesive or any other material, it is a measure of how much energy or work a system can endure before failure. Toughness is, thereofore, the critical dimension in this comparison and shear strength in PSI units is only of secondary interest. The shear strength of most cellulosic building materials is between 100 and 200 PSI. Therefore, the PSI values obtained with formulas 1A and 1B indicate that they are well above the threshold of rupture seen in tyical cellulosic materials.

Figure 3:
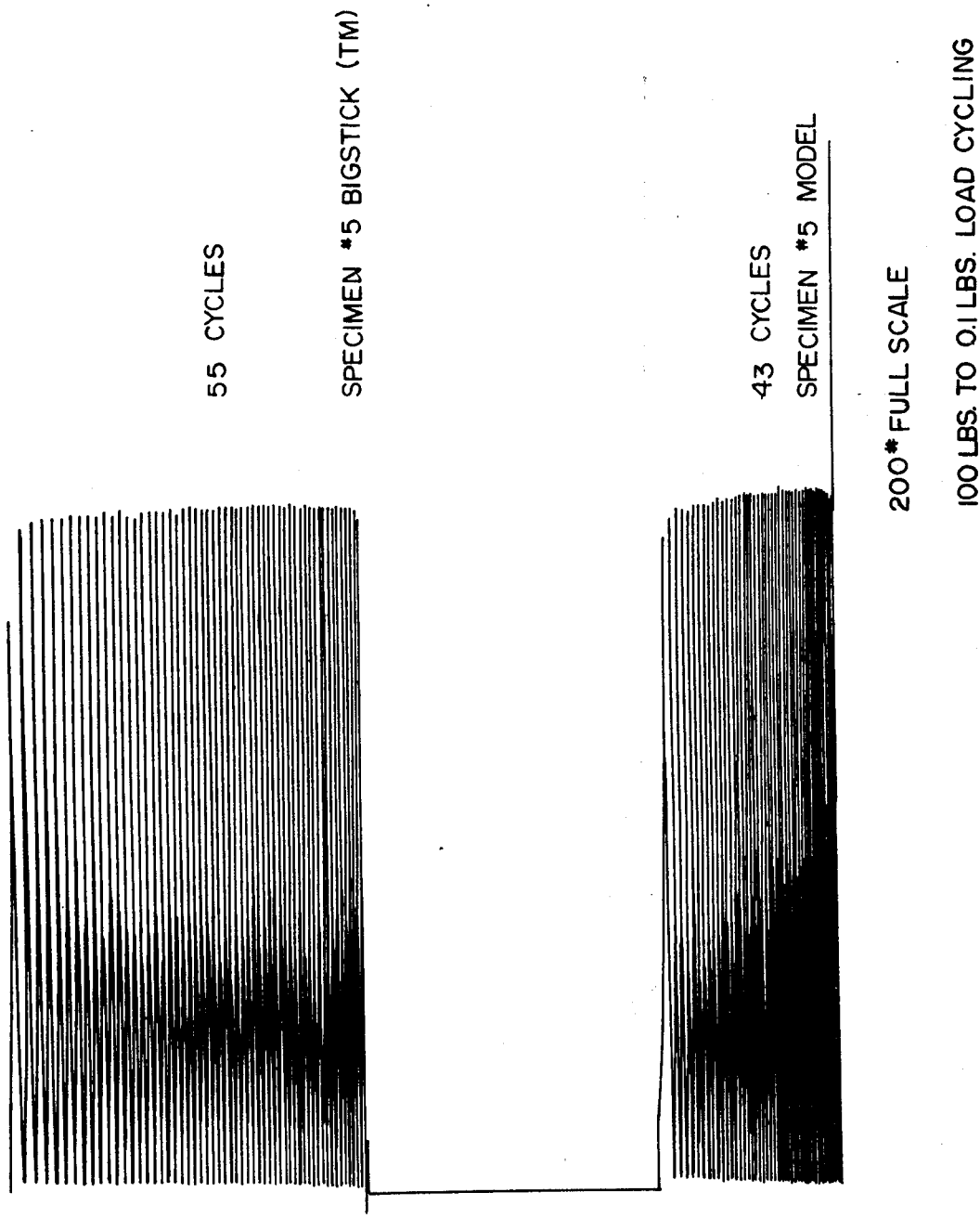

One of the outstanding characteristics of elastomeric adhesives is their ability to resist cyclic loading, (See graph FIG. 3*). During comparative evaluation of 1A vs. 1B, proof loading cycles to 100 PSI at the rate of about 20 cycles per minute were run. The assemblies tested showed a more rapid failure both in terms of the number of cycles to 100 PSI and as a function of time. Big Stick is the registered trademark of Champion International Corporation.

Using the same ASTM D-412 "dumbell" specimens, the elastomeric properties of 1A and 1B were tested. The criteria used were as follows:
1. Extension to Failure - expressed as the average percent elongation or extension tolerated in ten specimens before failure. ½
2. Percent Recovery After 100% Extension - this is the amount of recovery observed in the specimens after being stretched 100%, or to twice their original length.
3. Elastic Limit - the amount of extension or stretching possible, after which 100% recovery to original form is obtained.

Figure 4:
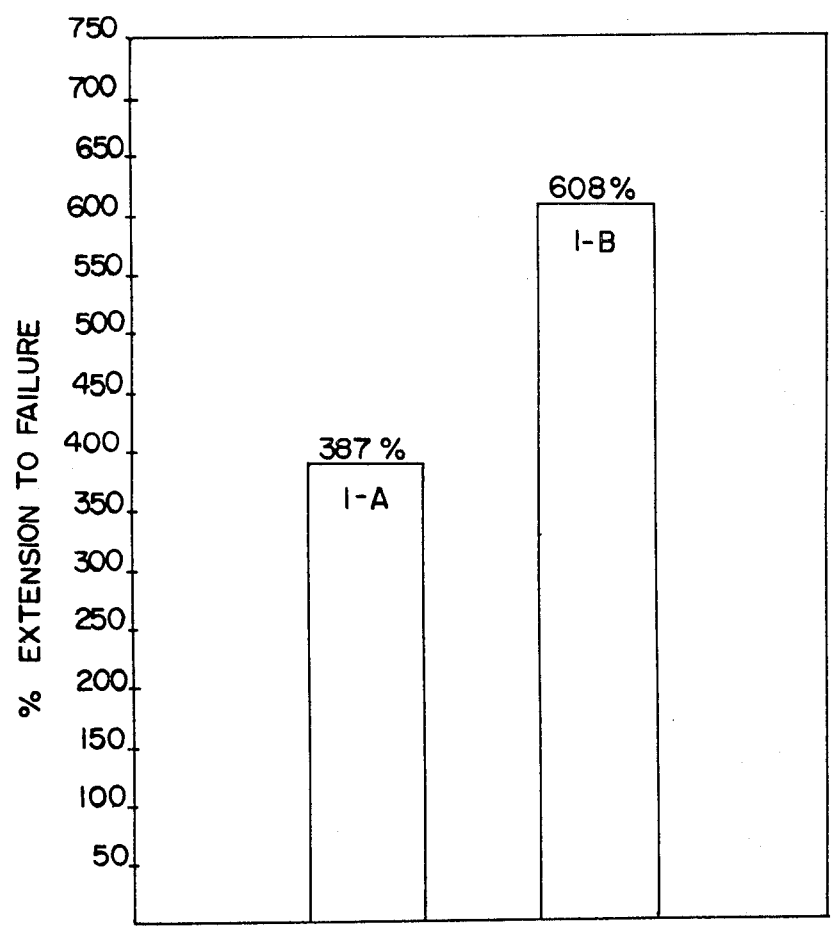
Figure 5:
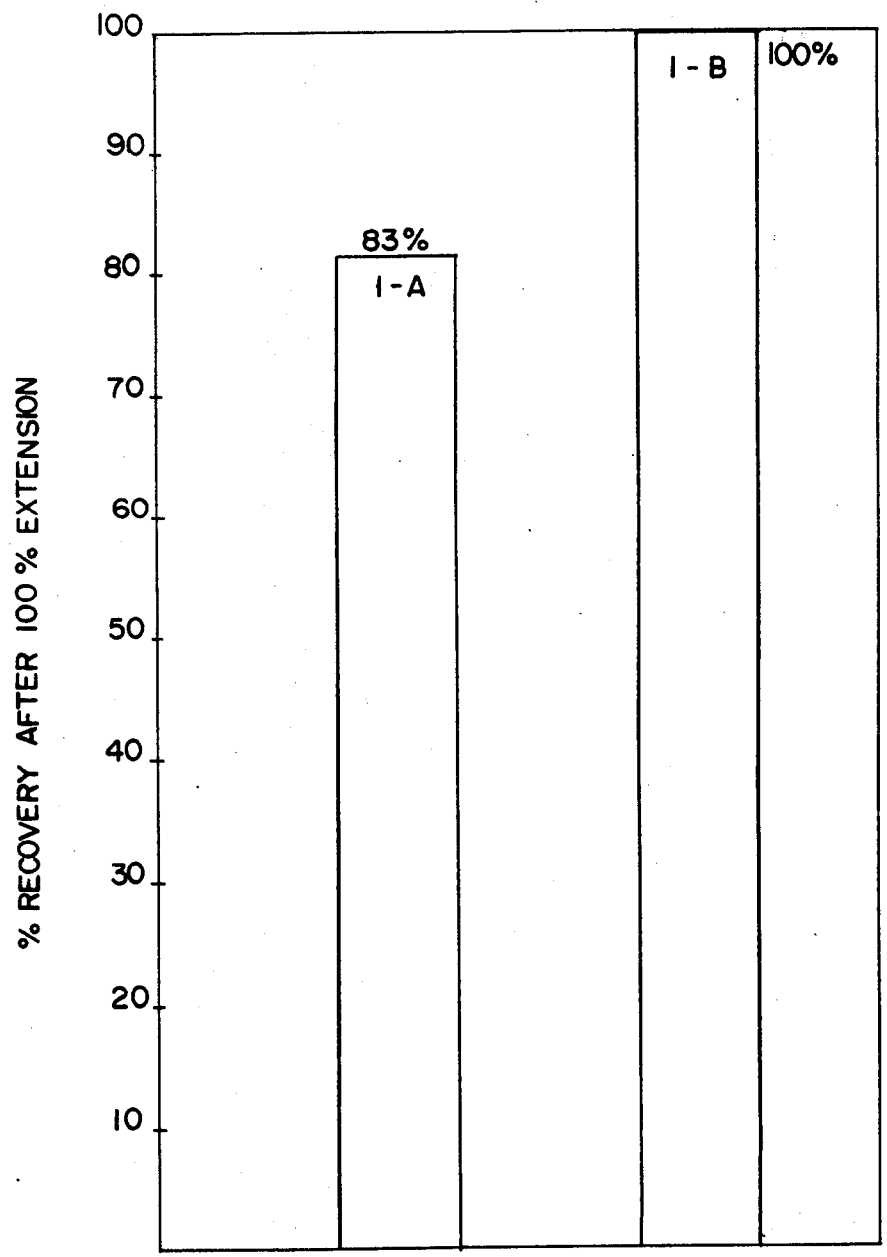
Figure 6:
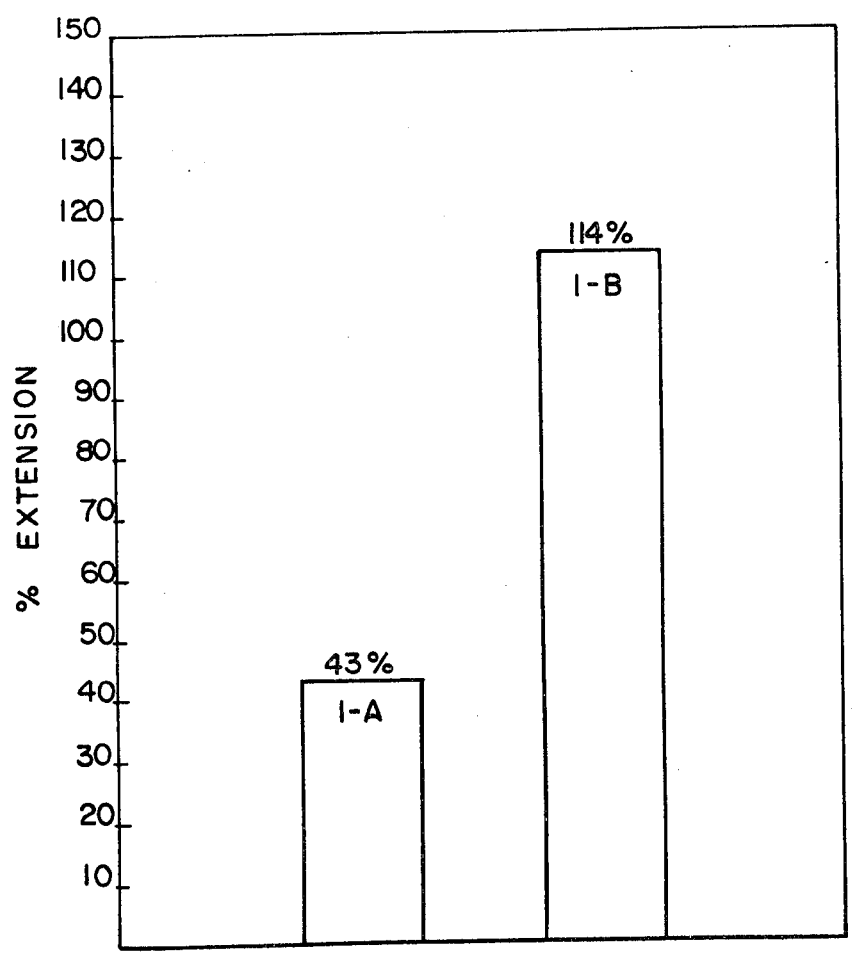
Figure 7:
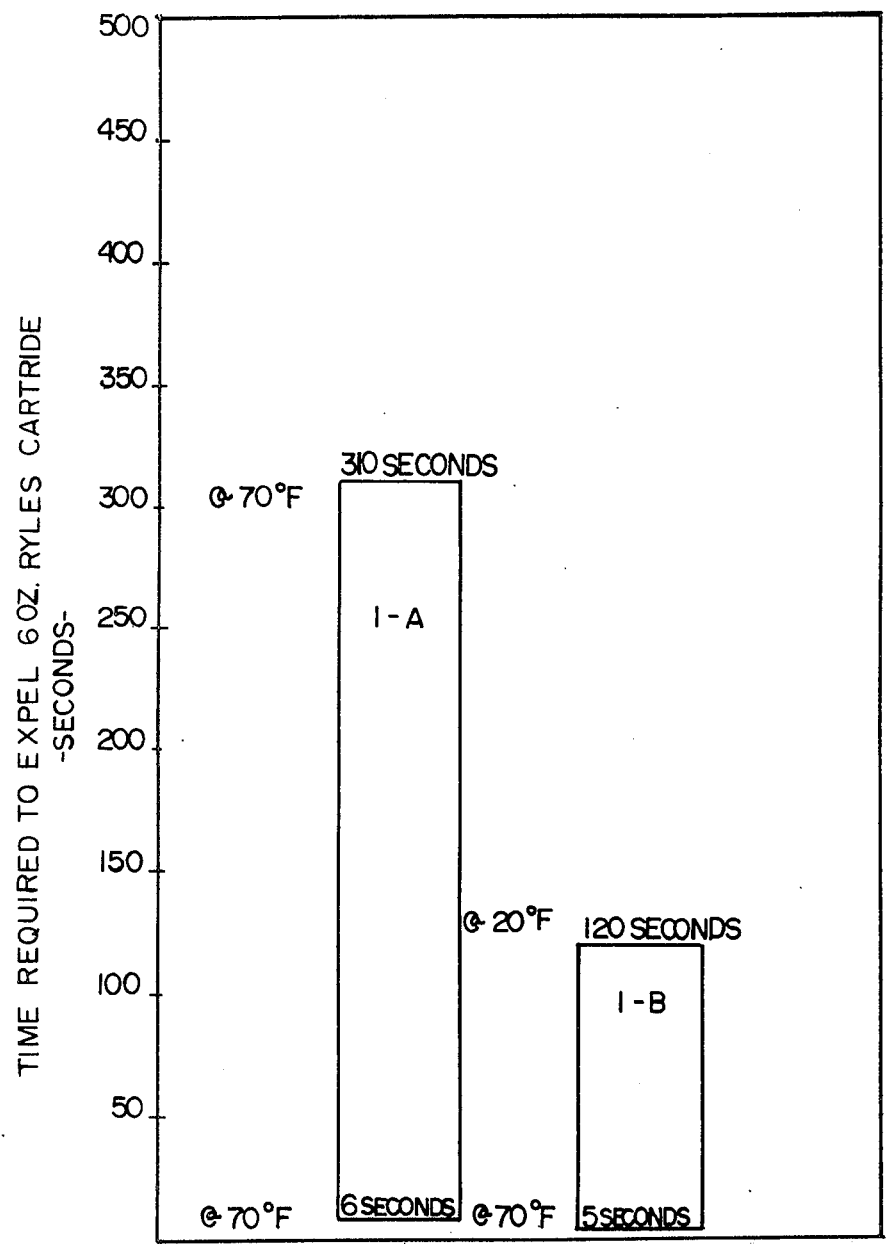

If the elastic limit is exceeded, the specimen assumes what is called a "set," a deformation from which it wil not fully recover. The following values are also illustrated in graph FIGS. 4, 5, 6). The data corresponding to the above criteria are as follows:

| | | 1A | 1B | |
|---|---|---|---|---|
| (1) | Extension to Failure | 387% | 608% | See graph FIG. 4 |
| (2) | Percent Recovery After 100% Extension | 83% | 100% | See graph FIG. 5. |
| (3) | Elastic Limit | 43% | 114% | See graph FIG. 6 |

This data was taken under ambient conditions. It is felt that the differences between 1A and 1B in elastic properties will be more dramatic at subambient temperatures.

The relative hardness of polymeric substances is frequently measured by a "Shore A Durometer." The following values were obtained with this instrument:

| | 1A | 1B |
|---|---|---|
| Shore A Hardness | 90 | 68 |

This is further indication of the comparative rigidity of 1A compared to the more resilient 1B formula.

The wet properties of 1A versus 1B shown improved slump resistance and low temperature flow properties. Slump resistance was measured at ambient (70° F), and elevated temperature (100° F) with a 6 inches × ¾ inches × 178 inches stainless steel slump channel. In both cases the 1A formula failed and 1B passed. Of particular interest is the ability of these formulations to pump and gun at low temperatures. In this evaluation a 6 ounce Pyles cartridge was used to extrude the mastic through a ⅛ inch orifice. Extrudability was determined by the amount of time (in seconds) it took to extrude a 6 ounce cartridge at ambient and subambient temperatures (20° F). The 20° F temperature was established because this is the lowest working temperature usually tolerated by workers in mobile home plants. (See graph Fig. 7).

In this test virtually no difference was seen in extrusion not at room temperature, however, at 20° F Formula A showed over twice the resistance to flow that 1B exhibited. Shear specimens that have been broken have shown better than 50% adhesive failure in 1A. B shows no adhesive failure but fails 100% by cohesive failure.

While the preferred mastics are water based mastics, other solvents may at times be used. These are, for example, ethyl alcohol, isopropyl alcohol, hexane, cyclohexane, mineral spirits of KB less than 27, ethylene glycol, monobutyl ether, 1, 1, 1, trichloroethane, 1, 1, 2, trichloroethane and perchloroethylene.

Thus the mastics of the present invention are preferably water based mastics containing from about 10% to 30% weight of water. Preferred amount of water is about 12% to 25% by weight, such as about 15%.

Other ingredients are, for example, acrylic latex binder containing 40% to 60% by weight of solids, the remainder being water.

| | Amount Wt. % | | |
|---|---|---|---|
| Acrylic Latex (40% – 60% solids) | 40% | – | 60% |
| Water | 10% | – | 30% |
| CaCO₃ | 5% | – | 15% |
| BaSO₄ | 1.0% | – | 8.0% |
| Polyvinyl acetate | 5.0% | – | 15% |
| Asbestos | 1.0% | – | 6.0% |
| Resilient Hollow Microspheres | .05% | – | 10% |

The preferred amounts of microspheres are about 0.1 to 3.0 weight % or about 5% to 30% by volume such as about 15% by volume.

The present invention is particularly directed toward an improved technique of introducing the hollow spheres into the mastic compositions whereby excellent uniform distribution is secured. The technique is illustrated diagramatically in the drawing of FIG. 8. Referring to the drawing, hollow resilient microspheres containing an expanding agent such as butane as, for example, "Saran" microspheres, are stored in a slurry tank 1. The slurry is an aqueous slurry containing about 10% to 20% such as about 15% by weight of microspheres.

The slurry is moved from tank 1 by means of pump 2 into a heating zone 3 wherein steam is introduced from zone 4. The temperature in zone 3 is in the range of about 80° C to 140° C, preferably 100° C to 120° C, such as about 100° C. The pressure is about 80 to 120, such as 100 PSIG. The heated slurry is then passed through a foaming or expanding chamber 5, for a period of about 0.5 to 5.0 seconds, preferably 1 to 3 seconds such as about 2 seconds, and then quenched in cooling zone 6.

The expanded microspheres slurry of about 30 microns is cooled to about 50° C to 65° C such as about 55° C. In accordance with the present technique, the quench is made preferably with an aqueous solution of the mastic introduced from zone 7, the finished mastic containing about 0.5 to 10% by weight of expanded hollow microspheres. A preferred mastic is a latex mastic in water wherein about 4 to 8 volumes of solution is added per volume of microspheres slurry solution. The relative amounts used are designed to secure the desired amount of water in the final product which is passed to zone 6. As point out heretofore, the preferred amount of water in the final product is in the range of about 10% to 30% by weight, and the preferred amount of microspheres is in the range of about 2% to 4% by weight.

Thus the present invention is concerned with improved mastic compositions as defined, "any of various pasty materials used as protective coatings or adhesives or cements," in conjunction with hollow resilient microspheres having diameters in the range of about 25 to 40 microns. It is greatly preferred that the solvent be water present in a concentration of about 10% to 30%, such as about 15% by weight.

A preferred mastic is 1B (Table I) as compared to mastic 1A (Table II). Properties of these respective mastic are as follows:

| PHYSICAL PROPERTIES FOR MASTIC ADHESIVE 1A & 1B | | |
| --- | --- | --- |
|  | 1A | 1B |
| % Solids | 64.0% | 51.1% |
| Wt/gallon | 11.480 lbs. | 8.377 lbs. |
| Viscosity | 746 M.cps | 340 M cps. |
| Viscosity Index[2] | 0.780 | 0.680 |

[1]Brookfield Helipath Viscometer (spindle T-F) (speed .5 RPM)
[2]Brookfield Helipath Viscometer (spindle T-F) (speeds .5 RPM & 1 RPM)

The physical properties above show a significant weight/gallon reduction realized in the Saran modified 1B formula. The rheological data shows the 1A formula to have over twice the viscosity of the microsphere modified system.

Viscosity Index is an index of a material that maintains its apparent viscosity over many different rates of shear, (rotational or extrusion), called "Newtonian" liquid. Liquids or mastics that increase in apparent viscosity as shear rates increase are called "Dilatent" liquids. In other words, the more energy that is applied to them the more they resist movement or shear. Conversly, materials that lose apparent viscosity as shear rates increase are called "thixotropic." Thixotropy is a most desirable quality in mastic. Mastic materials that exhibit thixotropy will 1. Pump, gun, or extrude with a minimum amount of effort or, over a longer distance with a given amount of pressure and a given size hose.
2. Pump, gun, or extrude at lower temperature with less resistance to flow.
3. Stay in place where they are applied without dripping or running.

The three categories of flow properties mentioned above are measured by their Viscosity Index. This is determined by taking a viscosity reading at a given shear rate, taking the same viscosity reading at twice the original shear rate, and dividing the value obtained with the faster rate by the lower rate. If the number obtained is one, the material is Newtonian, if the number is more than one it is Dilatent, and if the number is less than one it is Thixotropic.

Therefore, in the data column 1B is more thixotropic than 1A. This is an improvement over rheological properties usually obtained with conventional mineral fillers.

The differences in density in caulk and sealants that exist between the mineral filled caulks and Saran microsphere filled systems, the following exist in each of the caulk formulas (Tables III, IV, V, and VI).

| Solids by Weight | 11A 78.34% | 11B 48.285% |
| --- | --- | --- |
|  | 111A 72.47% | 111B 42.415% |
| Solids by Volume | 11A 69.893% | 11B 70.065% |
|  | 111A 62.218% | 111B 62.390% |

As seen above, there is a great difference in solids content and almost no difference in the volume of those same solids.

The graphs or charts, as illustrated by the graph figures, are attached hereto to dramatically visually portray, and as extensions of, the verbal statements in the specification, and thereby avoid clouding the more important disclosure set forth in the sole flow sheet figure constituting the drawing.

The embodiments of the invention in which an exclusive property or privilege is claimed are defined as follows:

1. Process for the preparation of a mastic adhesive composition which comprises subjecting an aqueous slurry of hollow, resilient expandable thermoplastic resinous microspheres formed of an expandable copolymer or vinylidene chloride and acrylonitrile having a diameter of about 6 to 8 microns and having incorporated therein a volatile liquid blowing agent for said thermoplastic resin, to a temperature of about 80° to 140° C. for a period of about 1 to 3 seconds whereby the blowing agent is converted to a gas causing the microspheres to expand, and then quenching to 50° to 65° C. with an aqueous mastic composition to increase the volume and decrease the weight of said adhesive.

2. Process according to claim 1 wherein said aqueous mastic composition contains about 40 to 60% by weight of an acrylic or vinyl acrylic latex binder containing about 40-60% solids.

3. Process according to claim 1 wherein said aqueous slurry contains 10 to 20% of microspheres.

4. Process according to claim 1 wherein said expanded microspheres have a diameter of about 25 to 40 microns.

5. Process according to claim 1 wherein said aqueous mastic composition is used in an amount to provide a mastic adhesive composition containing about 1.5 to 3.0% of microspheres and about 10 to 30% by weight of water.

* * * * *

UNITED STATES PATENT OFFICE
CERTIFICATE OF CORRECTION

Patent No. 4,005,033      Dated January 25, 1977

Inventor(s)    Phillip Carl Georgeau et al.     Page 1 of 2

It is certified that error appears in the above-identified patent and that said Letters Patent are hereby corrected as shown below:

Column 1, line 9, "coated" should read -- coating --.

Column 2, line 29, after "chloride/" insert -- acrylonitrile) and isobutane as the blowing agent. --.

Column 2, line 30, after "Company." delete "acrylonitrile) and isobutane as the blowing agent."

Column 3, line 23, "for" should read -- form --.

Column 5, lines 33 and 34, delete "Big Stick is the registered trademark of Champion International Corporation" and insert it at the bottom of the column preceded by an asterisk.

Column 5, line 52, delete the ")" after the "6".

UNITED STATES PATENT OFFICE
CERTIFICATE OF CORRECTION

Patent No. 4,005,033   Dated January 25, 1977

Inventor(s) Phillip Carl Georgeau et al.   Page 2 of 2

It is certified that error appears in the above-identified patent and that said Letters Patent are hereby corrected as shown below:

Column 5, line 40, delete "1/2"

Column 6, line 13, delete "178" and insert therefor

-- 1/2 inch --.

Signed and Sealed this

Thirty-first Day of May 1977

[SEAL]

Attest:

RUTH C. MASON
*Attesting Officer*

C. MARSHALL DANN
*Commissioner of Patents and Trademarks*